United States Patent Office 2,863,717
Patented Dec. 9, 1958

2,863,717

RECOVERY OF URANIUM VALUES FROM COPPER-BEARING SOLUTIONS

Robert Kunin, Trenton, N. J., assignor, by mesne assignments, to the United States of America as represented by the United States Atomic Energy Commission No Drawing. Application April 7, 1954
Serial No. 421,668

8 Claims. (Cl. 23—14.5)

This invention relates to the recovery of uranium. It relates to the separation and recovery of uranium values from solutions which contain, in addition to uranium compounds, salts of other metals. More specifically it relates to a process of separating copper and uranium compounds. It relates to a method of isolating uranium values by means of certain ion exchange resins of which the ion-retaining functional groups are enolizable 1,3-diketone groupings of the structure,

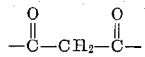

Although the strongly basic, quaternary ammonium anion exchange resins are quite satisfactory for adsorbing uranium complexes from low grade uranium sources, there are also many cases where such resins cannot be advantageously used. For example, there exist several uranium-containing wastes from which the uranium values cannot be removed by the conventional quaternary ammonium resins because the concentration of the accompanying impuritiese is too high or because strongly anionic uranium complexes which are adsorbed by such resins cannot be formed.

It is, therefore, an object of this invention to provide a method which can be used where other ion exchange methods fail. It is a further object to provide an ion exchange process by which uranium values can be separated from other metal contaminants—particularly copper.

These and other objects are accomplished by the process of this invention which comprises bringing an aqueous solution which contains uranium values, with or without salts of other metals, in contact with an ion exchange resin which retains certain metals, including uranium, by forming chelated structures therewith and thereafter selectively eluting the chelated metals. It is preferred that the contaminated, uranium-containing solution be passed through a layer or column or bed of particles of the resin; but other conventional methods such as agitating particles or larger pieces of the resin with the uranium-containing solution and removing the former by filtration, screening, or centrifuging may be employed if desired.

The instant process is particularly suitable for use with those ores from which both copper and uranium, are to be recovered. In this connection, torbernite, gilpinite, zeunerite, metazeunerite, and johannite come to mind. When solutions containing a mixture of uranyl ions and ions of other metals are brought in contact with the resins which contain enolizible 1,3-diketone groupings and which are in the sodium or potassium or ammonium form, only those metals which are capable of forming chelate structures are retained on the resin. For example, if a solution containing dissolved iron, aluminum, copper and uranium is passed through a bed of the resin, only copper and uranium are adsorbed. The iron and aluminum remain in solution and appear in the effluent. Ordinarily the copper is adsorbed in the upper part of the bed while uranium is adsorbed in a layer below tthe copper. After the resin has become exhausted by virtue of adsorbing its full capacity of copper and uranium, it must be regenerated. This is done in two steps. In the preferred procedure the ion exchange resin is first treated with an aqueous solution of an alkali metal cyanide. During this treatment the copper is removed—eluted—and that portion of the resin is restored to its original form. After the copper has been removed, and preferably after the resin has been thoroughly rinsed, the resin is treated with a solution of a soluble carbonate such as sodium, potassium or ammonium carbonate. This treatment effects the removal of uranium and restores the remainder of the resin to its original form. It is apparent that by this procedure uranium values are isolated and the other metals capable of forming chelate compounds—notably copper—are separated from those metals which are not capable of forming chelate structures.

It should also be noted that, after the adsorbed, chelated metal other than uranium is removed from the resin, the chelated uranium can be removed by elutants other than the carbonates. Thus, for example, the uranium can be removed by treating the resin with a solution of a strong mineral acid such as nitric acid or hydrochloric acid and a soluble salt of the acid such as an alkali metal or ammonium salt. A solution of nitric acid (0.1 N) and potassium nitrate (0.9 N) is particularly recommended. Alternatively, the uranium can be removed first with a soluble carbonate and the other metal can be removed later with a solution of a cyanide.

As noted above, the resins which are employed are those which have, as their polar, functional groups, enolizable 1,3-diketone groupings. Such resins are known and may be made, for example, by the process of U. S. Patent No. 2,613,200 wherein a methyl ketone is reacted with a cross-linked copolymer of an acrylic ester. The resins contain a number of functional groups of the structure

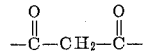

which groups retain certain metals by chelation.

The following example further illustrates the process of this invention.

*Example*

A solution containing the nitrate salts of iron, aluminum, copper, and uranium in amounts equivalent to one gram of each metal per liter of solution was passed through a bed of particles of an ion exchange resin in the sodium form prepared by the process of Example 1 of U. S. Patent No. 2,613,200, by reacting, in the presence of sodium ethoxide, acetone, and a cross-linked copolymer of 95% ethyl acrylate and 5% divinylbenzene. The functional, ion-adsorbing, enolizable, 1,3-diketo groups of this resin had the structure

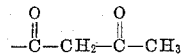

Neither the iron nor the aluminum was retained by the resin, as evidenced by analysis of the solution after it had passed through the bed of resin. The copper and uranium, on the other hand, were completely retained. After the bed of resin had become exhausted, it was rinsed with water and then treated with a one molar aqueous solution of sodium cyanide. The eluate was analyzed and was found to contain the original amount of copper. There was no evidence of the presence of uranium in the eluate. After being rinsed, the bed of resin was next treated with a one molar aqueous solution of sodium carbonate and the uranium was thus completely removed, as shown by analysis of that eluate.

In other tests potassium cyanide and potassium and ammonium carbonate were found to be the full equivalent of the corresponding salt of sodium as elutants. Furthermore, the same results were obtained in separating solutions of the same metals in the form of their chlorides.

Tests of solutions containing only uranium chloride or uranium nitrate in amounts equivalent to one gram of uranium per liter showed that the capacity of the resin is 4–5 milligrams of uranium, as $U_3O_8$, per milliliter of resin when the flow rate is 1 gal./cu. ft./minute.

Consequently there is provided by this invention a method for removing uranium salts from solutions thereof and for preparing more concentrated solutions of uranium salts and also for separating uranium salts from the salts of other metals.

I claim:

1. A method of recovering uranium values from an aqueous solution containing dissolved salts of metals including uranium and copper which comprises bringing said solution in contact with an insoluble ion exchange resin the ion-adsorbing functional groups of which are enolizable 1,3-diketo groups, adsorbing said uranium and copper salts on said resin, first eluting said adsorbed copper salt by means of an aqueous solution of an alkali metal cyanide and thereafter eluting said adsorbed uranium salt by means of an aqueous solution of an alkali metal carbonate.

2. The method of claim 1 in which the alkali metal cyanide is from the class consisting of sodium and potassium cyanides, and the carbonate is from the class consisting of ammonium, sodium and potassium carbonates.

3. A method of recovering uranium values from an aqueous solution containing dissolved salts of metals including uranium and copper which comprises bringing said solution in contact with an insoluble ion-exchange resin the ion-adsorbing functional groups of which are enolizable 1,3-diketone groups, adsorbing said uranium and copper salt on said resin, first eluting said adsorbed copper salt by means of an aqueous solution of an alkali metal cyanide, and thereafter eluting said adsorbed uranium salt by means of an aqueous solution containing both a strong mineral acid and a soluble salt of the acid.

4. The method of claim 3 in which the alkali metal cyanide is from the class consisting of sodium and potassium cyanides, the strong mineral acid is from the class consisting of hydrochloric and nitric acids, and the soluble salt of the acid is from the class consisting of the chlorides and nitrates of sodium, potassium, and ammonium.

5. A method of recovering uranium values from an aqueous solution containing dissolved salts of metals including uranium and copper which comprises bringing said solution in contact with an insoluble ion-exchange resin the ion-adsorbing functional groups of which are enolizable 1,3-diketone groups, adsorbing said uranium and copper salts on said resin, first eluting said adsorbed uranium salt by means of an aqueous solution of an alkali metal carbonate, and thereafter eluting said adsorbed copper salt by means of an aqueous solution of an alkali metal cyanide.

6. The method of claim 5 in which the alkali metal carbonate is from the class consisting of ammonium, sodium, and potassium carbonates, and the alkali metal cyanide is from the class consisting of sodium and potassium cyanides.

7. A method of recovering uranium values from an aqueous solution containing dissolved salts of metals including uranium and copper which comprises bringing said solution in contact with an insoluble ion-exchange resin the ion-adsorbing functional groups of which are enolizable 1,3-diketone groups, adsorbing said uranium and copper salts on said resin, first eluting said adsorbed uranium salt by means of an aqueous solution containing both a strong mineral acid and a soluble salt of the acid, and thereafter eluting said adsorbed copper salt by means of an aqueous solution of an alkali metal cyanide.

8. The method of claim 7 in which the strong mineral acid is from the class consisting of hydrochloric and nitric acids, the soluble salt of the acid is from the class consisting of the chlorides and nitrates of sodium, potassium, and ammonium, and the alkali metal cyanide is from the class consisting of sodium and potassium cyanides.

References Cited in the file of this patent

UNITED STATES PATENTS

| 2,613,200 | McBurney | Oct. 7, 1952 |
| 2,711,362 | Street | June 21, 1955 |

FOREIGN PATENTS

| 626,882 | Great Britain | July 22, 1949 |

OTHER REFERENCES

Morgan et al.: Journal of the Chemical Society (London), vol. 105, pp. 189–201 (1914).